United States Patent
Sittler

(10) Patent No.: US 6,508,129 B1
(45) Date of Patent: Jan. 21, 2003

(54) PRESSURE SENSOR CAPSULE WITH IMPROVED ISOLATION

(75) Inventor: Fred C. Sittler, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/477,689

(22) Filed: Jan. 6, 2000

(51) Int. Cl.$^7$ .................................................. G01L 7/00
(52) U.S. Cl. ........................................ 73/756; 73/715
(58) Field of Search .......................... 73/723, 717, 715, 73/729.2, 706

(56) References Cited

U.S. PATENT DOCUMENTS

| | | | |
|---|---|---|---|
| 3,079,576 A | 2/1963 | Kooiman | 338/4 |
| 3,147,085 A | 9/1964 | Gatti | 23/284 |
| 3,239,827 A | 3/1966 | Werner et al. | 340/236 |
| 3,356,963 A | 12/1967 | Buck | 331/65 |
| 3,387,226 A | 6/1968 | Haisma et al. | 331/94.5 |
| 3,405,559 A | 10/1968 | Moffatt | 73/398 |
| 3,477,036 A | 11/1969 | Haisma | 331/94.5 |
| 3,589,965 A | 6/1971 | Wallis et al. | 156/272 |
| 3,645,137 A | 2/1972 | Hazen | 73/398 |
| 3,696,985 A | 10/1972 | Herring et al. | 228/4.29 |
| 3,743,552 A | 7/1973 | Fa | 148/175 |
| 3,744,120 A | 7/1973 | Burgess et al. | 29/494 |
| 3,750,476 A | 8/1973 | Brown | 73/398 |
| 3,766,634 A | 10/1973 | Babcock et al. | 29/471.9 |
| 3,834,604 A | 9/1974 | Fendley et al. | 228/5 |
| 3,854,892 A | 12/1974 | Burgess et al. | 29/196.1 |
| 3,858,097 A | 12/1974 | Polye | 317/248 |
| 3,899,878 A | 8/1975 | Compton et al. | 60/39.28 T |
| 3,939,559 A | 2/1976 | Fendley et al. | 29/628 |
| RE28,798 E | 5/1976 | Herring et al. | 228/5.5 |
| 3,962,921 A | 6/1976 | Lips | 73/398 |
| 3,994,430 A | 11/1976 | Cusano et al. | 228/122 |
| 4,018,374 A | 4/1977 | Lee et al. | 228/121 |
| 4,064,549 A | 12/1977 | Cretzler | 361/283 |
| 4,078,711 A | 3/1978 | Bell et al. | 228/123 |
| 4,084,438 A | 4/1978 | Lee et al. | 73/706 |
| 4,088,799 A | 5/1978 | Kurtin | 427/38 |
| 4,127,840 A | 11/1978 | House | 338/4 |
| 4,128,006 A | 12/1978 | Grabow | 73/724 |

(List continued on next page.)

FOREIGN PATENT DOCUMENTS

| | | |
|---|---|---|
| CH | 8272/79 | 9/1979 |
| CH | 632 891 G | 11/1982 |
| CZ | 153132 | 5/1974 |

(List continued on next page.)

OTHER PUBLICATIONS

Newsfront; Why Nanoparticles Are So Big; Chemical Engineering 4–1999; p37–41.*
"Why Nanoparticles are so Big" for *Chemical Engineering*, by Charlene Crabb et al., pp. 37–41, Apr. 1999.
U.S. application No. 09/478,383, Lutz et al., filed Jan. 06, 2000.

(List continued on next page.)

*Primary Examiner*—Benjamin R. Fuller
*Assistant Examiner*—Andre Allen
(74) *Attorney, Agent, or Firm*—Westman, Champlin & Kelly, P.A.

(57) ABSTRACT

A pressure sensor capsule with a beam shaped sensor body, made of direct bonded layers of single crystal sapphire, surrounding a hollow central channel. A first beam end receives pressure and a second beam end has electrical contact pads and there is a mounting surface between the ends. The central channel has a narrower width passing through the mounting surface. An isolation plate is brazed to the mounting surface. Pressure sensing film is in the first end with leads extending through the channel to the electrical contact pads. The beam having a notch at the second end, forming an isolated lead surface on the central channel where the electrical contact pads are accessible.

16 Claims, 10 Drawing Sheets

U.S. PATENT DOCUMENTS

| | | | |
|---|---|---|---|
| 4,158,217 A | 6/1979 | Bell ........................... 361/283 |
| 4,177,496 A | 12/1979 | Bell et al. ................... 361/283 |
| 4,196,632 A | 4/1980 | Sikorra ........................ 73/718 |
| 4,202,217 A | 5/1980 | Kurtz et al. .................. 73/727 |
| 4,208,782 A | 6/1980 | Kurtz et al. .................. 29/580 |
| 4,216,404 A | 8/1980 | Kurtz et al. ................. 310/338 |
| 4,222,277 A | 9/1980 | Kurtz et al. .................. 73/721 |
| 4,236,137 A | 11/1980 | Kurtz et al. ................... 338/4 |
| 4,257,274 A | 3/1981 | Shimada et al. .............. 73/718 |
| 4,274,125 A | 6/1981 | Vogel .......................... 361/283 |
| 4,276,533 A | 6/1981 | Tominaga et al. .............. 338/4 |
| 4,278,195 A | 7/1981 | Singh ......................... 228/123 |
| 4,287,501 A | 9/1981 | Tominaga et al. ............ 338/42 |
| 4,301,492 A | 11/1981 | Paquin et al. ............... 361/283 |
| 4,359,498 A | 11/1982 | Mallon et al. ............... 428/156 |
| 4,366,716 A | 1/1983 | Yoshida ........................ 73/718 |
| 4,389,895 A | 6/1983 | Rud, Jr. ....................... 73/724 |
| 4,410,872 A | 10/1983 | Stecher et al. .............. 338/114 |
| 4,412,203 A | 10/1983 | Kurtz et al. ................... 338/4 |
| 4,416,156 A | 11/1983 | Demark et al. ............... 73/727 |
| 4,419,142 A | 12/1983 | Matsukawa ................ 148/1.5 |
| 4,422,125 A | 12/1983 | Antonazzi et al. ........... 361/283 |
| 4,422,335 A | 12/1983 | Ohnesorge et al. ........... 73/724 |
| 4,424,713 A | 1/1984 | Kroninger, Jr. et al. ....... 73/718 |
| 4,426,673 A * | 1/1984 | Bell et al. ..................... 73/724 |
| 4,434,665 A | 3/1984 | Adolfsson et al. ............ 73/724 |
| 4,443,293 A | 4/1984 | Mallon et al. ............... 156/647 |
| 4,454,765 A | 6/1984 | Lodge .......................... 73/724 |
| 4,456,901 A | 6/1984 | Kurtz et al. ................... 338/4 |
| 4,479,070 A | 10/1984 | Frische et al. .............. 310/338 |
| 4,495,820 A | 1/1985 | Shimada et al. .............. 73/724 |
| 4,497,473 A | 2/1985 | Robyn et al. .................. 266/44 |
| 4,507,973 A | 4/1985 | Barr et al. ..................... 73/724 |
| 4,517,622 A | 5/1985 | Male .......................... 361/283 |
| 4,525,766 A | 6/1985 | Petersen ..................... 361/283 |
| 4,535,219 A | 8/1985 | Sliwa, Jr. .................... 219/121 |
| 4,539,061 A | 9/1985 | Sagiv .......................... 156/278 |
| 4,542,436 A | 9/1985 | Carusillo .................... 361/283 |
| 4,547,801 A | 10/1985 | Haisma et al. .............. 358/111 |
| 4,558,817 A | 12/1985 | Kiendl .................... 236/12.12 |
| 4,572,000 A | 2/1986 | Kooiman ..................... 73/718 |
| 4,586,109 A | 4/1986 | Peters et al. ................ 261/283 |
| 4,591,401 A | 5/1986 | Neidig et al. ................ 156/89 |
| 4,598,996 A | 7/1986 | Taniuchi ..................... 356/43 |
| 4,609,966 A | 9/1986 | Kuisma ...................... 361/283 |
| 4,625,559 A | 12/1986 | Carter et al. ................. 73/706 |
| 4,628,403 A | 12/1986 | Kuisma ...................... 361/283 |
| 4,649,070 A | 3/1987 | Kondo et al. ............... 428/209 |
| 4,689,999 A | 9/1987 | Shkedi ........................ 73/708 |
| 4,703,658 A | 11/1987 | Mrozack, Jr. et al. ......... 73/724 |
| 4,716,492 A | 12/1987 | Charboneau et al. ........ 361/283 |
| 4,753,109 A | 6/1988 | Zabler ......................... 73/115 |
| 4,754,365 A | 6/1988 | Kazahaya ................... 361/283 |
| 4,764,747 A | 8/1988 | Kurtz et al. ................... 338/2 |
| 4,769,882 A | 9/1988 | Rosen et al. ............... 29/25.35 |
| 4,773,972 A | 9/1988 | Mikkor ....................... 204/16 |
| 4,774,196 A | 9/1988 | Blanchard ................... 437/24 |
| 4,780,572 A | 10/1988 | Kondo et al. ............... 174/52 |
| 4,800,758 A | 1/1989 | Knecht et al. ................ 73/727 |
| 4,806,783 A | 2/1989 | Anderson ................... 307/118 |
| 4,810,318 A | 3/1989 | Haisma et al. .............. 156/153 |
| 4,849,374 A | 7/1989 | Chen et al. ................. 437/209 |
| 4,852,408 A | 8/1989 | Sanders ....................... 73/718 |
| 4,857,130 A | 8/1989 | Curtis ......................... 156/292 |
| 4,875,368 A | 10/1989 | Delatorre .................... 73/151 |
| 4,879,903 A | 11/1989 | Ramsey et al. .............. 73/431 |
| 4,883,215 A | 11/1989 | Goesele et al. ............. 228/116 |
| 4,901,197 A | 2/1990 | Albarda et al. ............. 361/283 |
| 4,908,921 A | 3/1990 | Chen et al. ................ 29/25.41 |
| 4,929,893 A | 5/1990 | Sato et al. ................... 324/158 |
| 4,954,925 A | 9/1990 | Bullis et al. ................. 361/283 |
| 4,971,925 A | 11/1990 | Alexander et al. ............ 437/62 |
| 4,972,717 A | 11/1990 | Southworth et al. .......... 73/724 |
| 4,980,243 A | 12/1990 | Malikowski et al. ........ 428/621 |
| 4,983,251 A | 1/1991 | Haisma et al. .............. 156/630 |
| 4,994,781 A | 2/1991 | Sahagen ...................... 338/47 |
| 5,001,934 A | 3/1991 | Tuckey ........................ 73/721 |
| 5,005,421 A | 4/1991 | Hegner et al. ................ 73/72 |
| 5,009,689 A | 4/1991 | Haisma et al. ................ 65/33 |
| 5,013,380 A | 5/1991 | Aoshima .................... 156/250 |
| 5,024,098 A | 6/1991 | Petitjean et al. .............. 73/729 |
| 5,028,558 A | 7/1991 | Haisma et al. ................ 437/62 |
| 5,044,202 A | 9/1991 | Southworth et al. .......... 73/724 |
| 5,050,034 A | 9/1991 | Hegner et al. .............. 361/283 |
| 5,050,035 A | 9/1991 | Hegner et al. .............. 361/283 |
| 5,068,712 A | 11/1991 | Murakami et al. ............ 357/72 |
| 5,084,123 A | 1/1992 | Curtis ......................... 156/292 |
| 5,087,124 A | 2/1992 | Smith et al. ................ 356/358 |
| 5,088,329 A | 2/1992 | Sahagen ...................... 73/727 |
| 5,094,109 A | 3/1992 | Dean et al. ................... 73/718 |
| 5,095,741 A | 3/1992 | Bartig et al. ................. 73/115 |
| 5,113,868 A | 5/1992 | Wise et al. ................. 128/675 |
| 5,123,849 A | 6/1992 | Deak et al. ................... 439/66 |
| 5,133,215 A | 7/1992 | Lane, III et al. .............. 73/756 |
| 5,155,061 A | 10/1992 | O'Connor et al. ............ 437/86 |
| 5,157,972 A | 10/1992 | Broden et al. ................ 73/718 |
| 5,174,926 A | 12/1992 | Sahagen ...................... 252/521 |
| 5,178,015 A | 1/1993 | Loeppert et al. .............. 73/718 |
| 5,189,591 A | 2/1993 | Bernot ........................ 361/283 |
| 5,189,916 A | 3/1993 | Mizumoto et al. ............ 73/724 |
| 5,197,892 A | 3/1993 | Yoshizawa et al. ........... 439/91 |
| 5,201,228 A * | 4/1993 | Kojima ........................ 73/724 |
| 5,201,977 A | 4/1993 | Aoshima .................... 156/153 |
| 5,214,563 A | 5/1993 | Estes .......................... 361/386 |
| 5,214,961 A | 6/1993 | Kojima et al. ................ 73/715 |
| 5,227,068 A | 7/1993 | Runyon ...................... 210/610 |
| 5,228,862 A | 7/1993 | Baumberger et al. ......... 439/66 |
| 5,231,301 A | 7/1993 | Peterson et al. ............ 257/419 |
| 5,236,118 A | 8/1993 | Bower et al. ................ 228/193 |
| 5,242,863 A | 9/1993 | Xiang-Zheng et al. ....... 437/228 |
| 5,242,864 A | 9/1993 | Fassberg et al. ............. 437/228 |
| 5,257,542 A | 11/1993 | Voss ........................... 73/724 |
| 5,261,999 A | 11/1993 | Pinker et al. ................ 156/630 |
| 5,271,277 A | 12/1993 | Pandorf ....................... 73/724 |
| 5,287,746 A | 2/1994 | Broden ........................ 73/706 |
| 5,294,760 A | 3/1994 | Bower et al. ................ 200/83 |
| 5,314,107 A | 5/1994 | d'Aragona et al. .......... 228/116 |
| 5,315,481 A | 5/1994 | Smolley ..................... 361/707 |
| 5,319,324 A | 6/1994 | Satoh et al. ................. 331/158 |
| 5,326,726 A | 7/1994 | Tsang et al. ................ 437/228 |
| 5,332,469 A | 7/1994 | Mastrangelo ............... 156/643 |
| 5,349,492 A * | 9/1994 | Kinur et al. .................. 73/724 |
| 5,381,300 A | 1/1995 | Thomas et al. ............. 361/280 |
| 5,424,650 A | 6/1995 | Frick .......................... 324/688 |
| 5,437,189 A | 8/1995 | Brown et al. ................. 73/721 |
| 5,440,075 A | 8/1995 | Kawakita et al. ............ 174/265 |
| 5,466,630 A | 11/1995 | Lur ............................. 437/62 |
| 5,470,797 A | 11/1995 | Mastrangelo ............... 437/225 |
| 5,471,884 A | 12/1995 | Czarnocki et al. ............ 73/720 |
| 5,478,972 A | 12/1995 | Mizutani et al. ............ 174/250 |
| 5,479,827 A | 1/1996 | Kimura et al. ................ 73/718 |
| 5,481,795 A | 1/1996 | Hatakeyama et al. ......... 29/852 |
| 5,483,834 A | 1/1996 | Frick .......................... 73/724 |
| 5,528,452 A | 6/1996 | Ko ........................... 361/283.4 |
| 5,532,187 A | 7/1996 | Schreiber-Prillwitz et al. .......................... 437/182 |
| 5,554,809 A | 9/1996 | Tobita et al. ................. 73/700 |
| 5,612,497 A * | 3/1997 | Walter et al. ................. 73/756 |
| 5,637,802 A | 6/1997 | Frick et al. ................... 73/724 |
| 5,731,522 A | 3/1998 | Sittler ......................... 73/708 |
| 6,126,889 A | 10/2000 | Scott et al. ................. 264/632 |

| | | | |
|---|---|---|---|
| 6,131,462 A | * 10/2000 | Eernisse et al. | 73/702 |
| 6,311,563 B1 | 11/2001 | Ishikura | 73/724 |
| 6,106,476 A1 | 8/2002 | Corl et al. | 600/486 |

FOREIGN PATENT DOCUMENTS

| | | |
|---|---|---|
| DE | 1 648 764 | 6/1971 |
| DE | 2 021 479 | 11/1971 |
| DE | 2 221 062 | 11/1972 |
| DE | 24 59 612 | 7/1975 |
| DE | 34 04 262 A1 | 9/1984 |
| DE | 40 11 901 A1 | 10/1991 |
| DE | 42 44 450 A1 | 12/1992 |
| EP | 0 024 945 A2 | 9/1980 |
| EP | 0 136 050 A1 | 8/1984 |
| EP | 0 161 740 A2 | 2/1985 |
| EP | 0 166 218 A2 | 5/1985 |
| EP | 0 182 032 A2 | 9/1985 |
| EP | 0 190 508 A2 | 12/1985 |
| EP | 0 207 272 A2 | 5/1986 |
| EP | 0 213 299 A2 | 6/1986 |
| EP | 0 210 843 A2 | 7/1986 |
| EP | 0 256 150 A1 | 8/1986 |
| EP | 0 351 701 B1 | 7/1989 |
| EP | 0 355 340 A1 | 2/1990 |
| EP | 0 383 391 A1 | 8/1990 |
| EP | 0 430 676 A2 | 11/1990 |
| EP | 0 410 679 A1 | 1/1991 |
| EP | 0 413 547 A2 | 2/1991 |
| EP | 0 444 942 A1 | 9/1991 |
| EP | 0 444 943 A | 9/1991 |
| EP | 0 451 993 A2 | 10/1991 |
| EP | 0 456 060 A1 | 11/1991 |
| EP | 0 460 763 A2 | 11/1991 |
| EP | 0 473 109 A2 | 3/1992 |
| EP | 0 476 897 A2 | 3/1992 |
| EP | 0 526 290 A1 | 2/1993 |
| EP | 0 547 684 A2 | 6/1993 |
| EP | 0 556 009 A2 | 8/1993 |
| EP | 0 579 298 A1 | 1/1994 |
| EP | 0 928 959 A2 | 7/1999 |
| FR | 1 568 487 | 5/1969 |
| FR | 2 246 506 | 2/1975 |
| FR | 2 455 733 | 11/1980 |
| GB | 1 069 435 | 11/1963 |
| GB | 1 305 885 | 4/1971 |
| GB | 2034478 | 6/1980 |
| GB | 2 071 853 A | 3/1981 |
| GB | 2 168 160 A | 11/1985 |
| JP | 49-38911 | 4/1974 |
| JP | 60-97676 | 5/1985 |
| JP | 62-70271 | 3/1987 |
| JP | 60-195546 | * 7/1987 | G01L/9/00 |
| JP | 62-104131 | 7/1987 |
| JP | 62-167426 | 7/1987 |
| JP | 62-259475 | 11/1987 |
| JP | 63-285195 | * 11/1988 |
| JP | 63-292032 | 11/1988 |
| JP | 91-311556 | 4/1990 |
| JP | 2-148768 | 6/1990 |
| JP | 2-249936 | 10/1990 |
| JP | 3-239940 | 10/1991 |
| JP | -2852593 | * 3/1993 | G01L/9/12 |
| JP | 5-107254 | 4/1993 |
| JP | 5-231975 | * 9/1993 | G01L/9/12 |
| JP | 6-21741 | 1/1994 |
| JP | 6-265428 | 9/1994 |
| JP | 6-300650 | 10/1994 |
| JP | 2000111434 | 10/1998 |
| JP | 11-006780 | 12/1999 |
| RU | 463643 | 10/1975 |
| RU | 736216 | 5/1980 |
| RU | 1398825 A1 | 5/1988 |
| RU | 1597627 A1 | 10/1990 |
| RU | 1629763 A1 | 2/1991 |
| WO | WO 83/00385 | 2/1983 |
| WO | WO 85/02677 | 6/1985 |
| WO | WO 87/07947 | 12/1987 |
| WO | WO 87/07948 | 12/1987 |
| WO | WO 93/22644 | 11/1993 |
| WO | WO 96/16418 | 5/1996 |

OTHER PUBLICATIONS

U.S. application No. 09/478,434, Frick et al., filed Jan. 06, 2000.

U.S. application No. 09/603,640, Sittler et al., filed Jun. 26, 2000.

"Silicon–on–Sapphire Pressure Sensor", by C. Quinggui et al., *Tranducers*, (1987), 4 pages.

"Spectroscopic Study of the Surfaces of Glass Joined by Optical Contact", by V.M. Zolotarev et al., *Sov. J. Opt. Technol.*, (Jun. 1977), pp. 379–380.

"Effect of Scale and Time Factors on the Mechanical Strength of an Optical Contact", by S.S. Kachkin et al., *Sov. J. Opt. Technol.*, vol. 56, No. 2, (Feb. 1989), pp. 110–112.

"High Pressure Sensors", *Instrument Engineers Handbook vol. 1, Process Measurement*, B. Liptak, Editor, pp. 244–245.

"Silicon on Sapphire: The Key Technology for High–Temperature Piezoresistive Pressure Transducers", by H. W. Keller et al., *Transducers*, (1987), 4 pages.

"Optical–Contact Bonding Strength of Glass Components", by S.S. Kachkin et al., *Sov. J. Opt. Technol.*, vol. 47, No. 3, (Mar. 1980), pp. 159–161.

"A Cold High–Vacuum Seal Without Gaskets", by L. Macebo, *University of California Lawrence Radiation Laboratory*, (Sep. 1, 1962), pp. 1–11.

"Diffusionsschweissen Optischer Bauelemente Aus Quarzglas", by K. Veb. et al., *Schweisstechnik, Berlin*, (1983), pp. 262–264.

"Pressure and Temperature Measurements with Saw Sensors", D. Hauden et al., *36th Annual Frequency Control Symposium*, (1982), pp. 284–289.

"Transient Response of Capacitive Pressure Sensors", by P. Pons et al., *Sensors and Actuators*, (1992) pp. 616–621.

"Analysis and Design of a Four–Terminal Silicon Pressure Sensor at the Centre of a Diaphragm", by M. Bao et al., *Sensors and Actuators*, (1987), pp. 49–56.

"A Stress and Temperature Compensated Orientation and Propagation Direction for Surface Acoustic Wave Devices", by B. Sinha, *IEEE Transactions on Ultrasonics, Ferroelectrics, and Frequency Control*, vol. UFFC–34, No. 1, (Jan. 1987), pp. 64–74.

"Nonlinear Analyses on CMOS Integrated Silicon Pressure Sensors", by K. Suzuki et al., *IEEE*, (1985), pp. 137–140.

"New Techniques for Fusion Bonding and Replication for Large Glass Reflectors", by J.R. Angel, *Steward Observatory, University of Arizona*, pp. 52–56.

"Pressure Sensitivity in Anisotropically Etched Thin–Diaphragm Pressure Sensors", by S. Clark et al, *IEEE Transactions on Electron Devices*, vol. Ed–26, No. 12, (Dec. 1979), pp. 1887–1896.

"A Model for the Silicon Wafer Bonding Process", by R. Stengl et al., *Japanese Journal on Applied Physics*, (Oct. 1989), pp. 1735–1741.

"Study of the Stressed State of a Sintered Quartz Monoblock", by Y. Lisitsyn et al., *Plenum Publishing Corporation*, (1986), pp. 643–645.

"Direct Bonding in Patent Literature", by J. Haisma, *Philips J. Res.*, (1995), pp. 165–170.

"Special Issue on Direct Bonding", by J. Haisma et al., *Philips Journal of Research*, vol. 49, No. 1/2, (1995), pp. 1–182.

"Diversity and Feasibility of Direct Bonding: A Survey of a Dedicated Optical Technology", by J. Haisma et al., *Applied Optics*, vol. 33, No. 7, (Mar. 1994), pp. 1154–1169.

"Structure and Morphology of the Reaction Fronts During the Formation of $MgAl_2O_4$ Thin Films by Solid State Reaction Between R–cut Sapphire Substrates and MgO Films", by D. Hesse et al., *Interface Science*, (1994) pp. 221–237.

"Development of a High Temperature Capacitive Pressure Transducer", by R.L. Egger, *NASA CR–135282* (Oct. 1977), pp. 1–114.

"High Temperature Pressure Transducer", *Techlink Industry*, Techlink No 2359, (1978), 2 pages.

"Quartz Capsule Pressure Transducer for the Automotive Industry", by D.Y. Lee et al., *SAE Technical Paper Series Society of Automotive Engineers, Inc.*, (Feb. 1981), 6 pages.

"Low–Cost High–Sensitivity Integrated Pressure and Temperature Sensor", by P. Pons et al., *Sensors and Actuators*, (1994), pp. 398–401.

"A New Type of High Performance Device for VSLI Digital System", by X. Xiao–Li et al., *Solid State Devices*, (1988), pp. 579–582.

"Wafer Bonding For SOI", by W. P. Maszara et al., *Mat. Res. Soc. Symp. Proc.* vol. 107, (1988), 2 pages.

"Silicon Fusion Bonding For Pressure Sensors", by K. Petersen et al., *IEEE*, (1988), pp. 146–147.

"Silicon–To–Silicon Direct Bonding Method", by M. Shimbo et al., *Journal of Applied Physics*, vol. 60, No. 8, (Oct. 1986), pp. 2987–2989.

"A Model for the Silicon Wafer Bonding Process", by Stengl et al., *Japanese Journal of Applied Physics*, vol. 28, No. 10, (Oct. 1989), pp. 1735 & 1741.

"A Small and Stable Continuous Gas Laser", by H.G. Van Bueren et al., *Physics Letters* vol. 2, No. 7, (Nov. 1962), 2 pages.

"Direct Bonding of Ceramics and Metals by Means of a Surface Activation Method in Ultrahigh Vacuum", by T. Suga et al., *Proceedings of the MRS International Meeting on Advanced Materials*, vol. 8, (Jun. 1988), pp. 257–263.

"Silicon–On–Insulator Wafer Bonding–Wafer Thinning Technological Evaluations", by J. Haisma et al., *Japanese Journal of Applied Physics*, vol. 28, No. 8, (Aug. 1989), 4 pages.

"Closure and Repropogation of Healed Cracks in Silicate Glass", by T. Michalske et al., *Journal of the American Ceramic Society*, vol. 68, No. 11, (Nov. 1985), 3 pages.

"Use of Strain Gauges with a Silicon–On–Sapphire Structure for Thermophysical Experiments", by V.F. Kukarin et al., *Plenum Publishing Corporation*, (1986) pp. 1085–1087.

"Metrological Characteristics for Sapfir–22D Pressure Sensors", by A.M. Evtyushenkov et al., *Plenum Publishing Corporation*, (1989), pp. 147–150.

"Low–Temperature Characteristics of the Transducer", *Rev. Sci. Instrum.*, vol. 56, No. 6, (Jun. 1985), pp. 1237–1238.

"The Joining of Ceramics", by A.S. Bahrani, *Int. J. for the Joining of Materials*, vol. 4, No.1, (1992), pp. 13–19.

"Chemical Free Room Temperature Wafer to Wafer Direct Bonding", by S. Farrens et al., *J. Electrochem. Soc.*, vol. 142, No. 11, (Nov. 1985), pp. 3949–3955.

"Morphological Evolution of Pore Channels in Alumnia", by J. Rodel et al., *Ceramics Transactions –Sintering of Advanced Ceramics*, vol. 7, (May 1988), pp. 243–257.

"Le Poli Optique, Element De La Construction Des Tubes A Vide(')", by P. Danzin et al., *Annales De Radioelectricite*, (Jan. 1948), pp. 281–289.

"Strength of Glass Ceramic S0115M and its Joints Based on Optical Contact", by A.I. Busel et al, *Plenum Publishing Corporation*, (1983), p. 378.

"Bubble–Free Silicon Wafer Bonding in a Non–Cleanroom Environment", by R. Stengl et al., *Department of Mechanical Engineering and Materials Science, Duke University*, (1988) p. L2364.

"Boundary Migration of Single Crystal in Polycrystalline Alumina", by M. Kinoshita, *Journal of the Ceramic Society of Japan*, vol. 82, No. 945, (1974), pp. 295–296.

"Diffusion Bonding of Ceramics", by C. Scott et al., *American Ceramic Society Bulletin*, (Aug. 1985) pp. 1129–1131.

"Creep of Sensor's Elastic Elements: Metals versus Non––metals", K. Bethe, D. Baumgarten and J. Frank, *Nova Sensor –Silicon Sensors and Microstructure*, 1990, pp. 844–849.

"High–Temperature Healing of Lithographically Introduced Cracks in Sapphire", J. Rödel and A.M. Glaeser, *J. Am. Ceram. Soc.*, vol. 73, No. 3, Mar. 1990, pp. 592–601.

"Fabrication of an Implantable Capacitive Type Pressure Sensor", S. Shoji, T. Nisase, M. Esashi and T. Matsuo, *Transducers '87*, 1987.

"Small sensitive pressure transducer for use at low temperatures", W. Griffioen and G. Frossati, *Rev. Sci. Instrum.*, vol. 56, No. 6, Jun. 1985, pp. 1236–1238.

"Interface charge control of directly bonded silicon structures", S. Bengtsson and O. Engström, *J. Appl. Phys.*, vol. 66, No. 3, Aug. 1, 1989, pp. 1231–1239.

"Wafer bonding for silicone–on–insulator technologies", J.B. Lasky, *Appl. Phys Lett.*, vol. 48, No. 1, Jan. 1, 1986, pp. 78–80.

"Production of Controlled–Morphology Pore Arrays: Implications and Opportunities", J. Rödel and A.M. Glaeser, *J. Am. Ceram. Soc.*, vol. 70, No. 8, Aug. 1987, pp. C–172 –C–175.

"Low–Temperature Preparation of Silicon/Silicon Interface by the Silicon–to–Silicon Direct Bonding Method", by S. Bengtsson et al., *J. Electrochem. Soc.*, vol. 137, No. 7, (Jul. 1990), pp. 2297–2303.

"Phase Formation Study in $\alpha-Al_2O_3$ Implanted With Niobium Ions", by L. Romana, P. Thevenard, B. Canut, G. Massouras and R. Brenier, *Nuclear Instruments and Methods in Physics Research B*46, published by Elsevier Science Publishers B.V. (North–Holland), pp. 94–97 (1990).

"Surface electrical properties of Ni–implanted sapphire", by L. Shipu, F. Donghui, X. Ning, S. Zhenya and C. Xiaoming, *Processing of Advanced Materials*, published by Chapman & Hall, pp. 77–80 (1991).

"Silicon Microcavities Frabricated with a New Technique", L. Tenerz and B. Hök, *Electronics Letters*, vol. 22, No. 11, May 22, 1986, pp. 615–616.

"A Balanced Resonant Pressure Sensor", E. Stemme and G. Stemme, *Sensors and Actuators*, A21–A23, 1990, pp. 336–341.

"Silicon Sensors and Microstructure", J. Brysek, K. Petersen, J. Mallon, Jr., L. Christel, F. Pourahmadi, *Nova Sensor*, Jun. 1990, pp. 5.4–5.8, 8.21–8.23, 9.9–9.10, 9.13–9.15.

* cited by examiner

US 6,508,129 B1

PRESSURE SENSOR CAPSULE WITH IMPROVED ISOLATION

CROSS REFERENCE TO CO-PENDING APPLICATIONS

This application is related to co-pending application Ser. No. 09/478,383 filed Jan. 6, 2000 entitled METHOD AND APPARATUS FOR A DIRECT BONDED ISOLATED PRESSURE SENSOR, and co-pending application Ser. No. 09/478,434 filed Jan. 6, 2000 entitled CAPACITIVE PRESSURE SENSING WITH MOVING DIELECTRIC.

BACKGROUND OF THE INVENTION

In aviation or industrial fluid pressure sensors, isolation of electrical leads from corrosion and isolation of the pressure sensing film from mounting stress are both desired for long term reliability and accuracy.

Fluids (pressurized media) can corrode metal sensing films and leads. Metal sensing films are thus preferably placed inside a pressure sensor body and leads are also preferably routed inside the body and isolated in such a way that corrosive process fluids do not come in contact with the sensing films, electrical leads and electrical contact pads. Corrosive process fluids can include gasses in an aerospace or stationary turbine engine, acids, caustics, oils, petrochemicals, foodstuff and the like.

Mechanical isolation of the sensor from mounting and lead stress variations is also a problem, and there is a desire to arrange sensor geometry to reduce transmission of stresses from mounting and electrical leads to the pressure sensor diaphragm. These stresses often vary with temperature.

When layers of sensor bodies are bonded together using bonding materials, or when ceramic layers are sintered together at high temperatures, residual stresses can be left in the sensor bodies that are temperature sensitive and generate stress in sensing diaphragms, causing further errors.

It is difficult to find a combination of materials, type of bonding, electrical lead connections, mounting and sensor geometry that meets the demanding requirements for industrial and aerospace pressure sensor applications. Excellent isolation from corrosion, high monotonicity or linearity, stability, accuracy and isolation from errors due to environmental factors such as temperature changes and mounting stress changes are all desired, but difficult to achieve in a single sensor that will meet the needs of a broad range of demanding industrial and aerospace applications.

SUMMARY OF THE INVENTION

A pressure sensor capsule with improved isolation for a broad range of demanding industrial or aerospace applications is disclosed.

The pressure sensor capsule includes a pressure sensing body formed as a beam made of direct bonded layers of single crystal sapphire. The beam forms a beam wall around a central channel. The beam has a first end having a diaphragm adapted for fluid pressurization, and an opposite second end. The beam wall has an outer beam mounting surface between the ends. The central channel has a first width near the first end and has a second width, near the mounting surface, that is narrower than the first width.

The pressure sensor capsule includes an isolation plate. The isolation plate has a mounting hole therethrough and the beam mounts through the mounting hole. A braze joint sealingly joining the outer beam mounting surface to the mounting hole, sealingly isolating the second end from pressurized fluid.

Conductive film is disposed in the central channel. The conductive film includes a pressure sensing portion on the diaphragm, and a sensor lead portion extending from the pressure sensing portion to electrical contact pads. The beam has a notch at the second end. The notch forms an isolated lead surface on the central channel where the electrical contact pads are accessible.

DETAILED DESCRIPTION OF THE PREFERRED EMBODIMENTS

Figure 1:
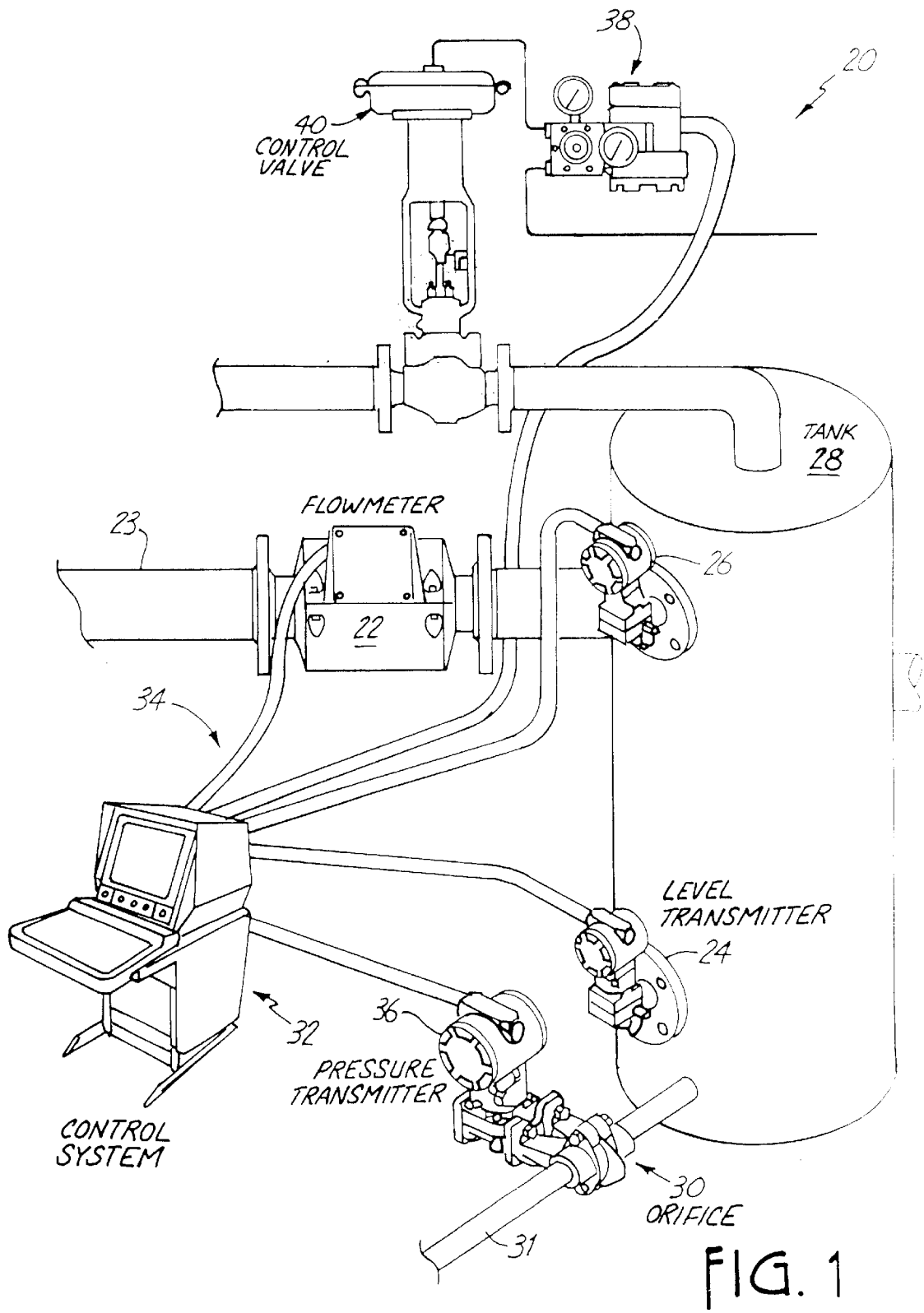
FIG. 1 shows a typical industrial environment for a loop powered industrial pressure transmitter with a pressure sensor capsule.

In FIG. 1, a typical environment for an industrial pressure sensor is illustrated at 20. In FIG. 1, process variable transmitters such as flow meter 22 in process fluid line 23, level transmitters 24, 26 on tank 28 and integral orifice flow meter 30 in process line 31 are shown electrically connected to control system 32. Process variable transmitters can be configured to monitor one or more process variables associated with fluids in a process plant such as slurries, liquids, vapors and gasses in chemical, pulp, petroleum, gas, pharmaceutical, food and other fluid processing plants. The monitored process variables can be pressure, temperature, flow, level, pH, conductivity, turbidity, density, concentration, chemical composition or other properties of fluids. A process variable transmitter includes one or more sensors that can be either internal to the transmitter or external to the transmitter, depending on the installation needs of the process plant.

Process variable transmitters generate one or more transmitter outputs that represent the sensed process variable. Transmitter outputs are configured for transmission over long distances to a controller or indicator via communication busses 34. In typical fluid processing plants, a communication buss 34 can be a 4–20 mA current loop that powers the transmitter, or a fieldbus connection, a HART protocol communication or a fiber optic connection to a controller, a control system or a readout. In transmitters powered by a 2 wire loop, power must be kept low to provide intrinsic safety in explosive atmospheres.

In FIG. 1, integral orifice flow meter 30 includes pressure transmitter 36 that couples along a communication bus 34 connected to it. Level transmitters 24, 26 also include pressure transmitters. Control system 32 can be programmed to display process conditions for a human operator, and can be programmed to sense the process conditions and control the process via output devices such as current to pressure converter 38 and control valve 40, for example.

In FIG. 1, pressure transmitters at 24, 26 and 36 have pressure sensors that are exposed to process fluids in various pipes and tanks that can be corrosive. Pressure sensors inside pressure transmitters at 24, 26 and 36 are arranged to include tantalum interconnects.

Figure 2:
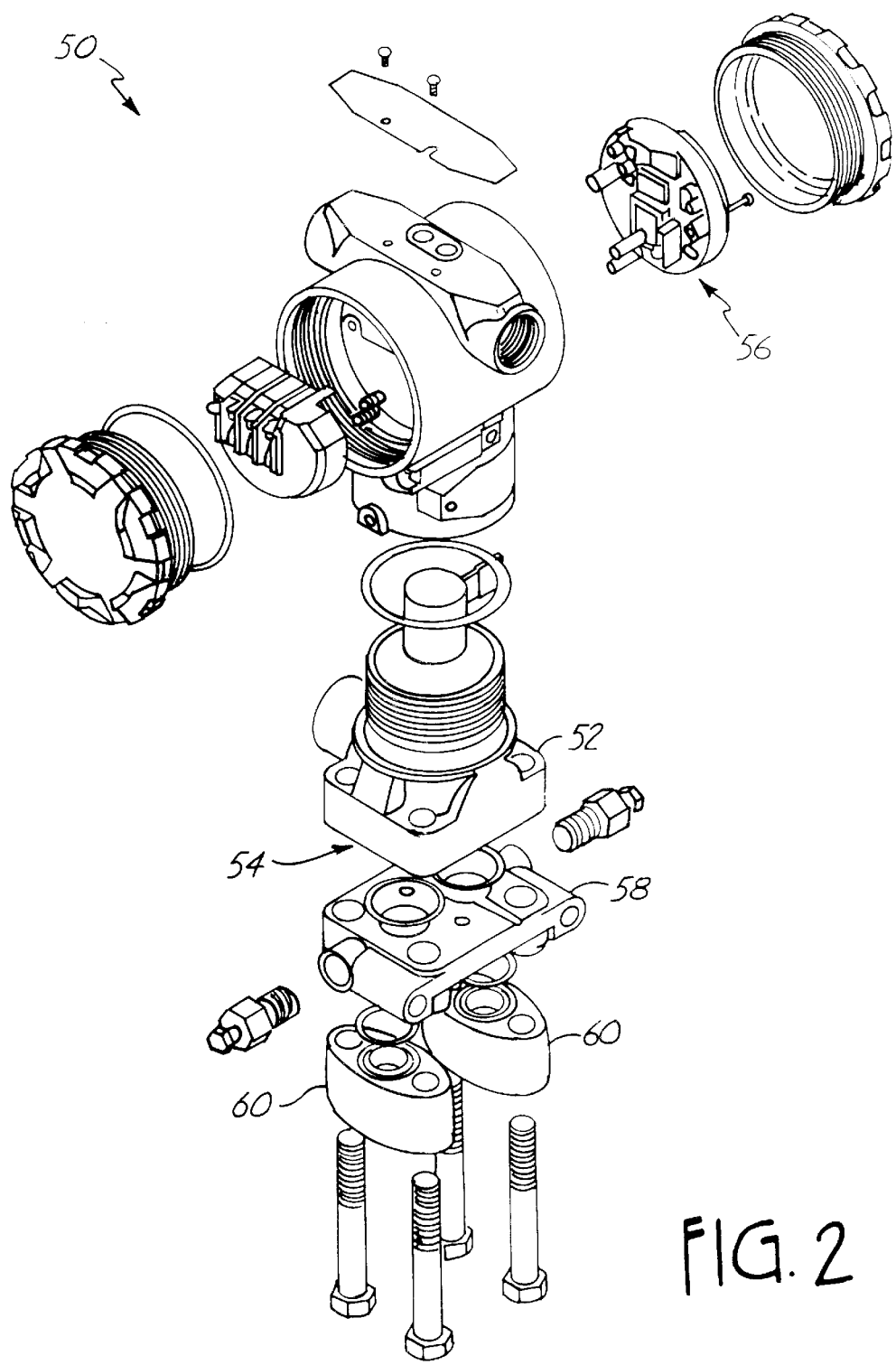
FIG. 2 shows an embodiment of a loop powered industrial differential pressure transmitter with a pressure sensor capsule.

In FIG. 2, an exploded view of a pressure transmitter 50 is shown generally. Transmitter 50 includes a flange 52 for receiving a differential pressure, two absolute pressure sensor capsules 54 (not shown), and electronics 56. Transmitter 50 is bolted to flange adapter 58. Flange adapter 58 connects to impulse pipes connected to flange adapter unions 60 or other connection hardware. Each absolute pressure sensor capsule 54 includes a sensor and associated fluid isolation and stress isolation features.

Figure 3:
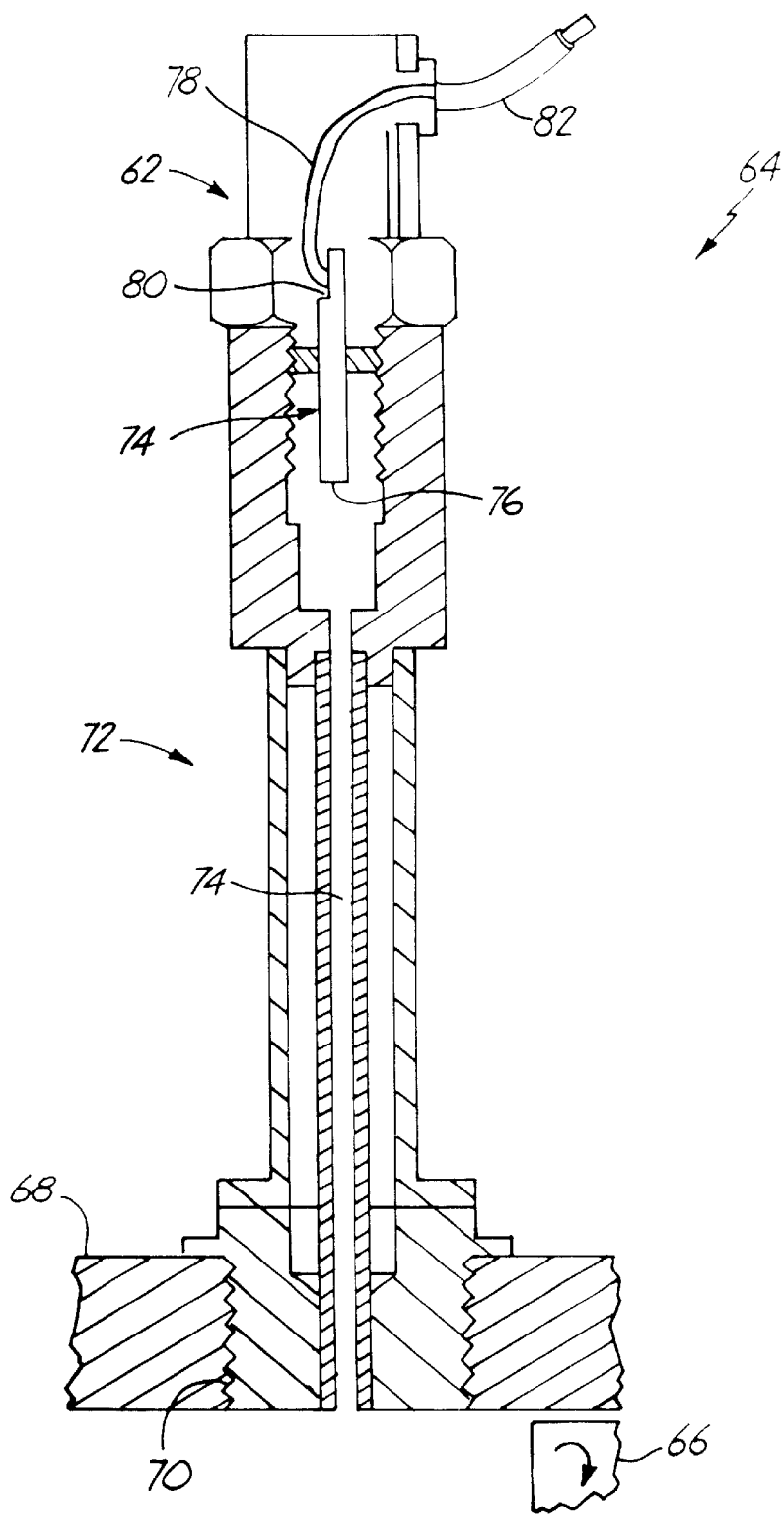
FIG. 3 shows an embodiment of a pressure sensor capsule in a typical turbine engine installation.

FIG. 3 shows a pressure sensor capsule 62 for a turbine engine arrangement 64. The turbine engine includes turbine engine blades such as blade 66 rotating in a turbine engine housing 68. A mounting hole 70 is provided in the turbine engine housing 68 for sensing pressure in the turbine engine. Pressure sensor capsule 62 is spaced apart from the turbine housing 68 by a pedestal 72. Pedestal 72 spaces pressure sensor capsule 62 away from the turbine housing to provide a lower temperature environment for pressure sensor capsule 62. A passageway 74 through pedestal 72 couples the pressurized gasses inside the turbine housing to the pressure sensing capsule 62. A pressure sensor 74 is included in pressure sensing capsule 62. Pressure sensor 74 includes an integral beam with an integral blind end 76 exposed to the pressurized gasses. Pressure sensor 74 also includes isolated sensor leads 78 that pass through a sealed gap 80 in the beam and connect to electronic conversion circuits (not shown) by leads 82.

In FIG. 3, a turbine engine pressure probe has improved isolation. The probe comprises a mounting pedestal having a first end adapted for mounting to a turbine engine housing and having a second end spaced apart from the first end and having a mounting hole shaped to receive a pressure sensor.

Figure 4:
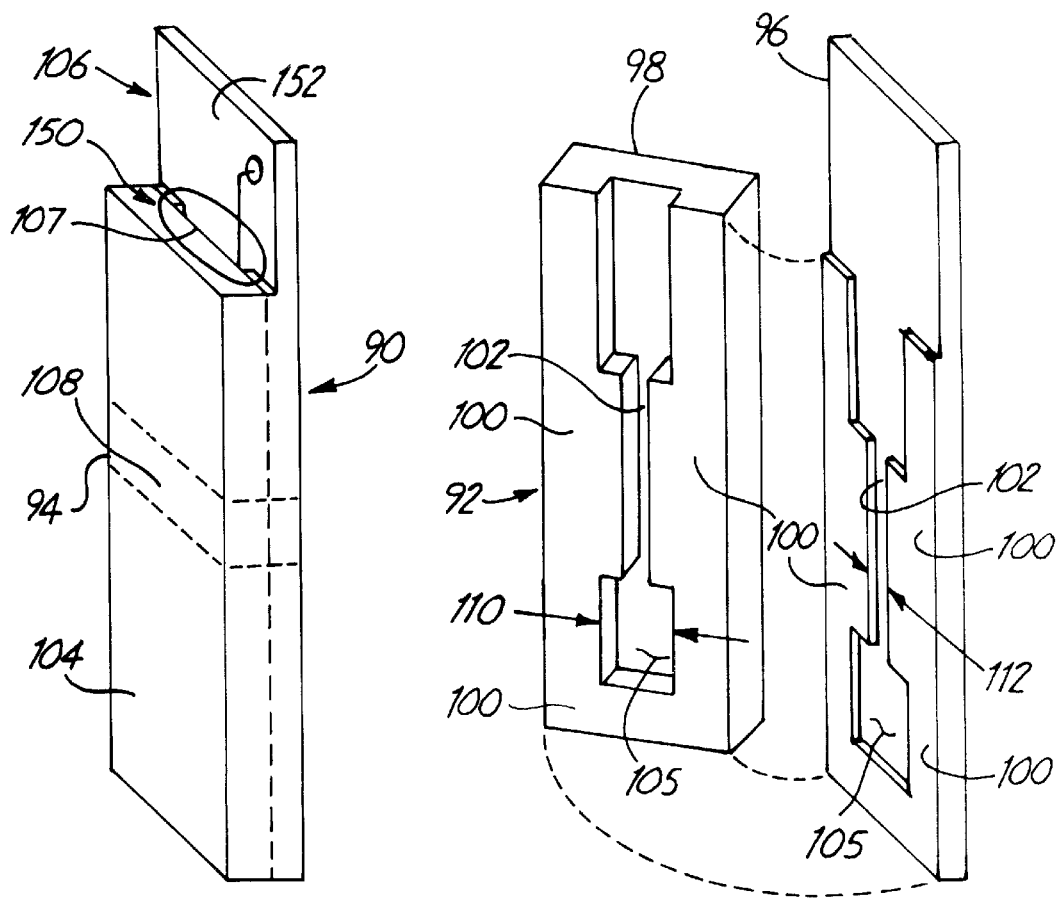
FIG. 4 shows an assembled view and an exploded view of layers of a pressure sensor with a channel in both layers.

In FIG. 4, a pressure sensor is shown in an assembled view at 90, and is shown in an exploded view at 92. Pressure sensor 94 has a pressure sensor body arranged in the shape of a beam and is made of a first layer 96 and a second layer 98, both of single crystal sapphire. The first layer 96 and the second layer 98 are bonded together by a process of direct bonding. With direct bonding, mirror polished surfaces of sapphire are brought in contact with each other and bond without any intermediate bonding materials or sintering. Methods of direct bonding are described in U.S. Pat. No. 5,024,098 Petitjean et al., U.S. Pat. No. 5,349,492 Kimura et al. U.S. Pat. No. 5,013,380 Aoshima, U.S. Pat. No. 5,201,977 Aoshima, Swiss Patent (Auslegeshrift) 632,891 G, and French Patent 2,246,506 Podvigalkina. The use of single crystal sapphire provides a pressure sensor body that is free of hysteresis. The use of single crystal sapphire also make the use of direct bonding possible. With direct bonding, there are no intermediate bonding materials which are subject to corrosion or which could include residual stress which would be temperature sensitive.

In FIG. 4, the beam 94 forms a beam wall 100 around a central channel 102, the beam 94 having a first end 104 with one or more diaphragms 105 adapted for fluid pressurization, and an opposite second end 106. The beam wall 100 has an outer beam mounting surface 108 between the ends. The central channel 102 has a first width 110 near the first end 104 and has a second width 112 near the mounting surface 108 that is narrower than the first width 110. The first width 110 provides a surface for a deflectable sensing diaphragm 105 and the narrower second width 112 serves to strengthen the central portion of the beam, reducing the undesired transmission of mounting stress or lead stress to the sensing diaphragm.

Figure 5:
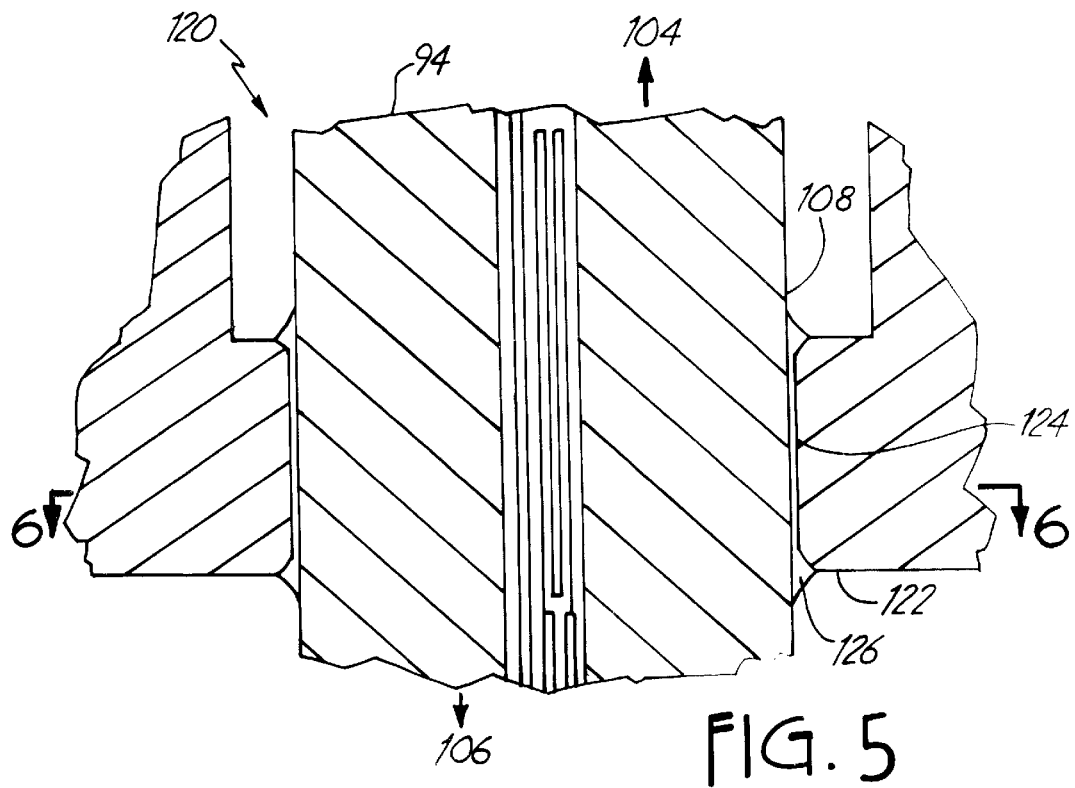
FIG. 5 shows a first layer of the pressure sensor of FIG. 4.

In FIG. 5, a partial sectional front view of a pressure sensor capsule 120 is shown. An isolation plate 122 having a mounting hole 124 therethrough and the beam 94 is mounted through the mounting hole 124. A braze joint 126 sealingly joins the outer beam mounting surface 108 to the mounting hole 124. The mounting sealingly isolates the second end 106 from the fluid pressurization at end 104. This arrangement provides two kinds of isolation. The brazed mounting provides a fluid barrier so that pressurized fluid does not reach electrical contact pads at the second end, avoiding corrosion of the contact pads by the pressurized fluid. The electrical contact pads and the diaphragm are at opposite ends of the beam shaped sensor body, providing desired mechanical isolation between them, so that any force exerted by the electrical leads is greatly attenuated before it can reach the sensing diaphragm.

Figure 6:
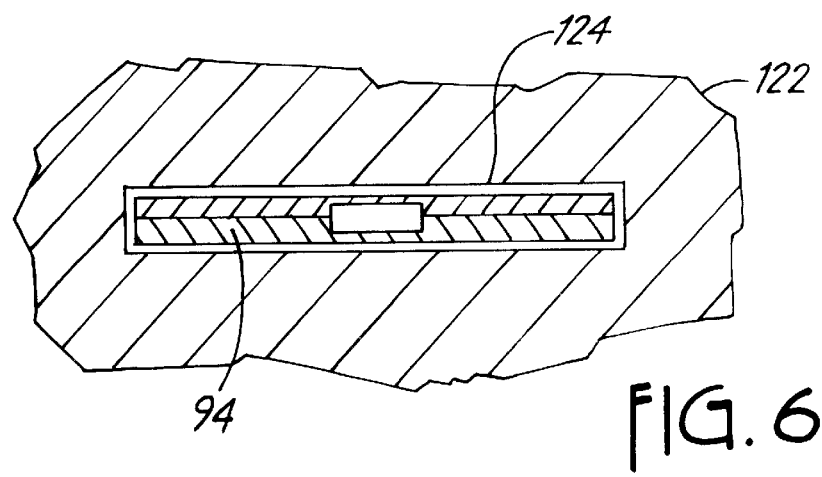
FIG. 6 shows a second layer of the pressure sensor of FIG. 4.

In FIG. 6, a partial sectional view along line 66 in FIG. 5 further illustrates the brazed joint 126. The braze joint goes completely around the sensor body, providing a seal. The sensor itself, being formed of direct bonded single crystal sapphire layers, becomes a single, integral, seamless body by use of the direct bond, and provides no path for fluid leakage past the braze joint.

Figure 7:
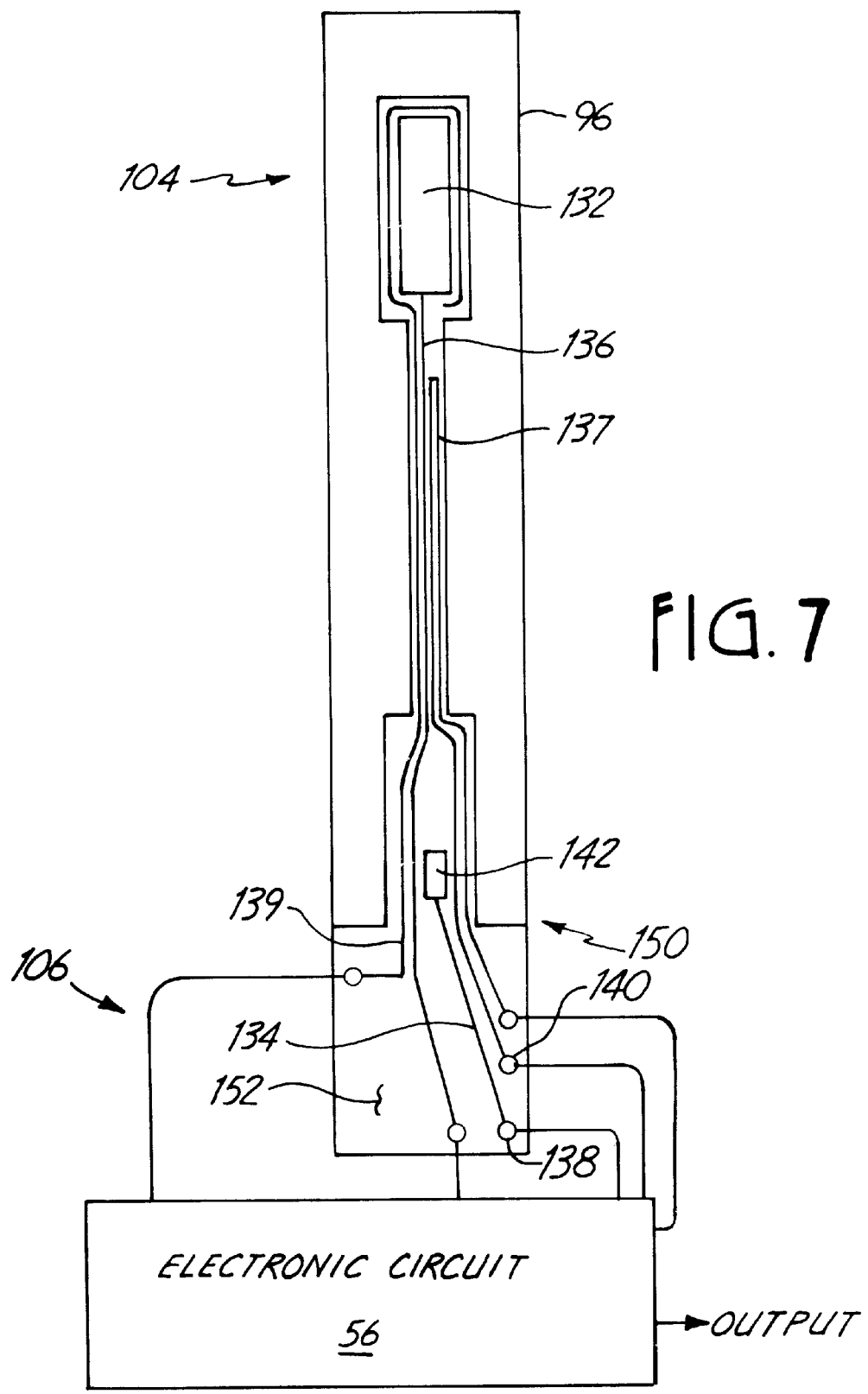
FIG. 7 shows a front sectional view of a brazed joint in a pressure sensor capsule.
Figure 8:
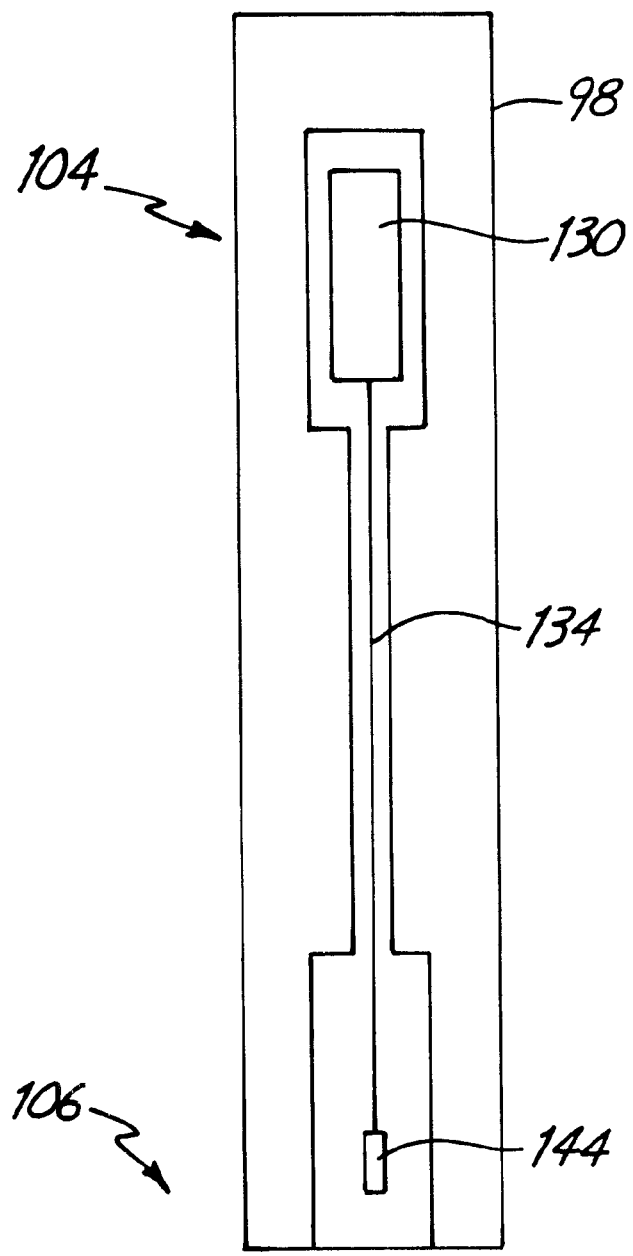
FIG. 8 shows a top sectional view of a brazed joint in a pressure sensor capsule.

In FIGS. 7–8, deposits of conductive film in the central channel 102 are shown. Pressure sensing film portions 130, 132 are deposited adjacent the first end 104 on diaphragm 105, which is deflectable by pressure. The pressure sensing film portions 130, 132 form a pressure sensing capacitance that is deflected by pressurization of end 104 of the sensor. Sensor lead portions 134, 136 extend from the pressure sensing portions 130, 132 to electrical contact pads 138, 140. Conductor portion 134 connects from one layer to the other by means of a grown electrical contact at 142, 144. The grown electrical contact includes a deposit of a growable material, such as tantalum. After the sensor is assembled, the sensor is heated and the tantalum grows to bridge the gap between the layers and form an interconnection. A conductor portion 139 can be provided for electrical shielding of the sensing circuitry.

The beam 94 has a notch 150 at the second end 106. The notch 150 forms an isolated lead surface 152 on the central channel where the electrical contact pads 138, 140 are accessible. The notch exposes a surface of the central channel with the contact pads. This arrangement avoids the need to perform the difficult task of depositing leads extending out of the channel to the outer end of the beam. Contact pads on the outer end of the beam would be very susceptible to damage during handling, while the placement of the electrical contact pads in the notch provides some degree of protection from scratching of the films. Electrical open circuits are thus avoided.

Single crystal sapphire is a preferred material for sensor bodies. Single crystal sapphire has excellent mechanical properties and corrosion resistance. Also, single crystal sapphire can be direct bonded. When direct bonding of single crystal sapphire is used, mating surfaces must be extremely flat, clean and fully in contact with one another in order for a direct bond to be achieved. Direct bonding avoids the use of bonding materials. Direct bonding also avoids high levels of residual stress associated with high temperature processes such as sintering of ceramics.

The braze joint 126 is preferably formed essentially of gold and germanium to provide good compatibility with brazing to single crystal sapphire. A metallization can be deposited on the sapphire to provide a better joint, if desired. The isolation plate preferably consists essentially of Alloy 46 which is compatible with the braze joint formed of gold and germanium.

The pressure sensor capsule preferably comprising a seal 107 disposed in the notch, sealing off a high quality vacuum in the channel to form an absolute pressure sensor capsule. The braze joint has a melting temperature that is lower than the melting temperature of the seal, and the seal is preferably a glass frit. The isolation of the electrical contact pads 138, 140 tends to reduce hysteresis during pressure cycling.

A temperature sensor 137 is preferably disposed in the narrower width of the channel. The temperature sensor is used to sense the temperature of the sensor, enabling a circuit attached to the sensor to provide temperature compensation. The isolation of the electrical contact pads away from the sensing diaphragm tends to reduce hysteresis during temperature cycling.

The sensor capsule can be manufactured using a series of process steps. A beam is formed from direct bonded layers of single crystal sapphire. The beam has a beam wall around a central channel. A first end of the beam is closed or blind, and is adapted for fluid pressurization. A notch is provided at an opposite second end, the notch forming an isolated lead surface on the central channel. The beam wall has an outer beam mounting surface between the ends which can be metallized if desired to improve brazing. The central channel is formed with a first width near the first end and with a second width, near the mounting surface, that is narrower than the first width. A mounting hole is formed through an isolation plate. The beam is mounted through the mounting hole.

A braze joint is brazed, joining the outer beam mounting surface to the mounting hole. The braze joint sealingly isolating the isolated lead surface on the central channel from the fluid pressurization.

A conductive film is deposited in the central channel, including a pressure sensing film portion on a deflectable diaphragm or diaphragms adjacent the first end, and a sensor lead portion extending from the pressure sensing portion to electrical contact pads on the isolated lead surface on the central channel.

The isolation plate can be formed as an isolation cup having a mounting hole therethrough and the beam mounting through the mounting hole, the cup having sidewalls extending around the first end of the beam, protecting the beam from damage by handling.

The single crystal sapphire beam is preferably batch fabricated on a wafer with multiple beams.

An electronic circuit 56 in a transmitter can be coupled to the electrical contact pads and providing a transmitter output representative of the sensed pressure.

The transmitter is preferably a differential transmitter, as shown in FIG. 2, and includes both a first pressure sensor capsule as described above, and a second sensing arrangement sensing a second pressure, the second sensing arrange including a second beam made of direct bonded layers of single crystal sapphire, second isolator cup, second conductive film and second braze joint and second electrical contact pads, the second electrical contact pads also coupling to the electronic circuit 56. The differential pressure transmitter senses a pressure difference and generates an output representing differential pressure.

Figure 9:
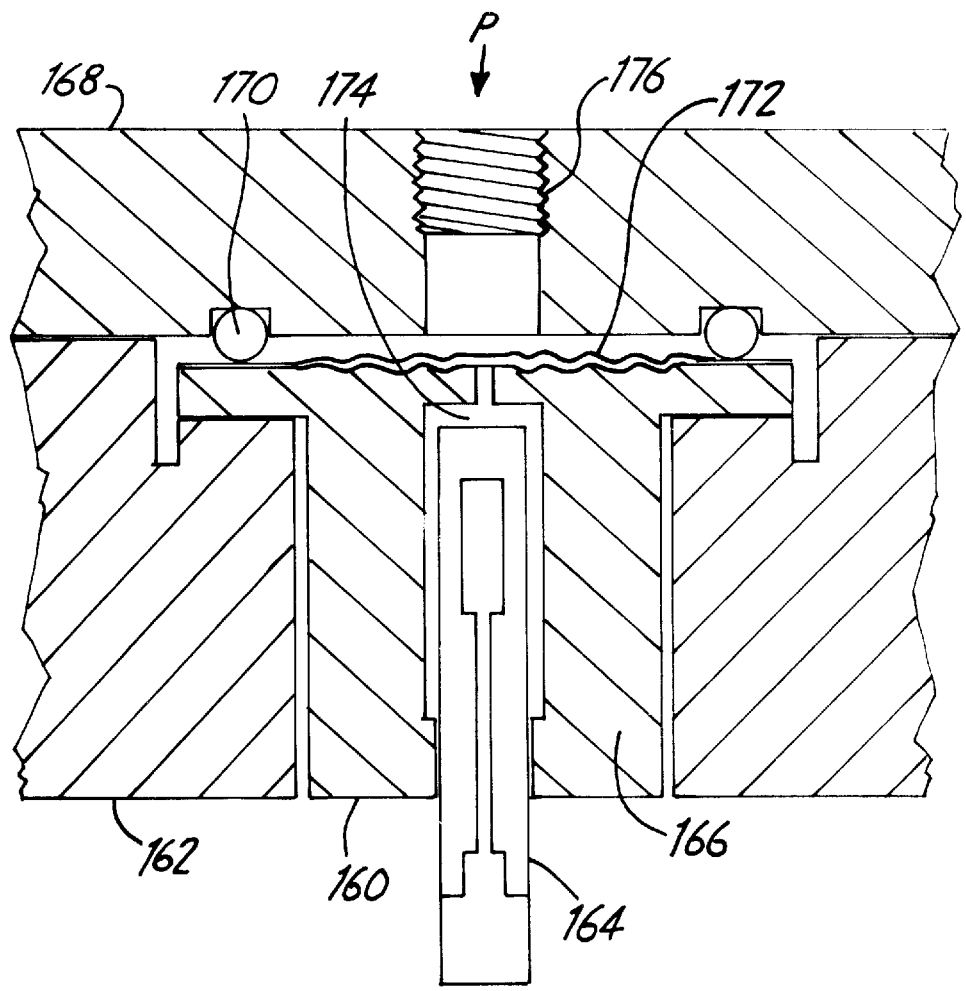
FIG. 9 shows a front sectional view of a pressure sensor capsule mounted in a transmitter body.

In FIG. 9, a pressure sensor capsule 160 is shown in cross section mounted in a pressure transmitter body 162. Pressure sensor capsule 160 includes a beam shaped pressure sensor 164 as described above and an isolation cup 166 brazed to the pressure sensor 164. A mating flange 168 is sealed to the pressure sensor capsule 160 by an O ring 170. Pressure capsule 160 is preferably provided with an isolator diaphragm 172 and is filled with isolator fluid 174 to provide an additional layer of protection and isolation for the sensor. Process fluid pressure P is applied via a threaded fitting 176.

Figure 10:
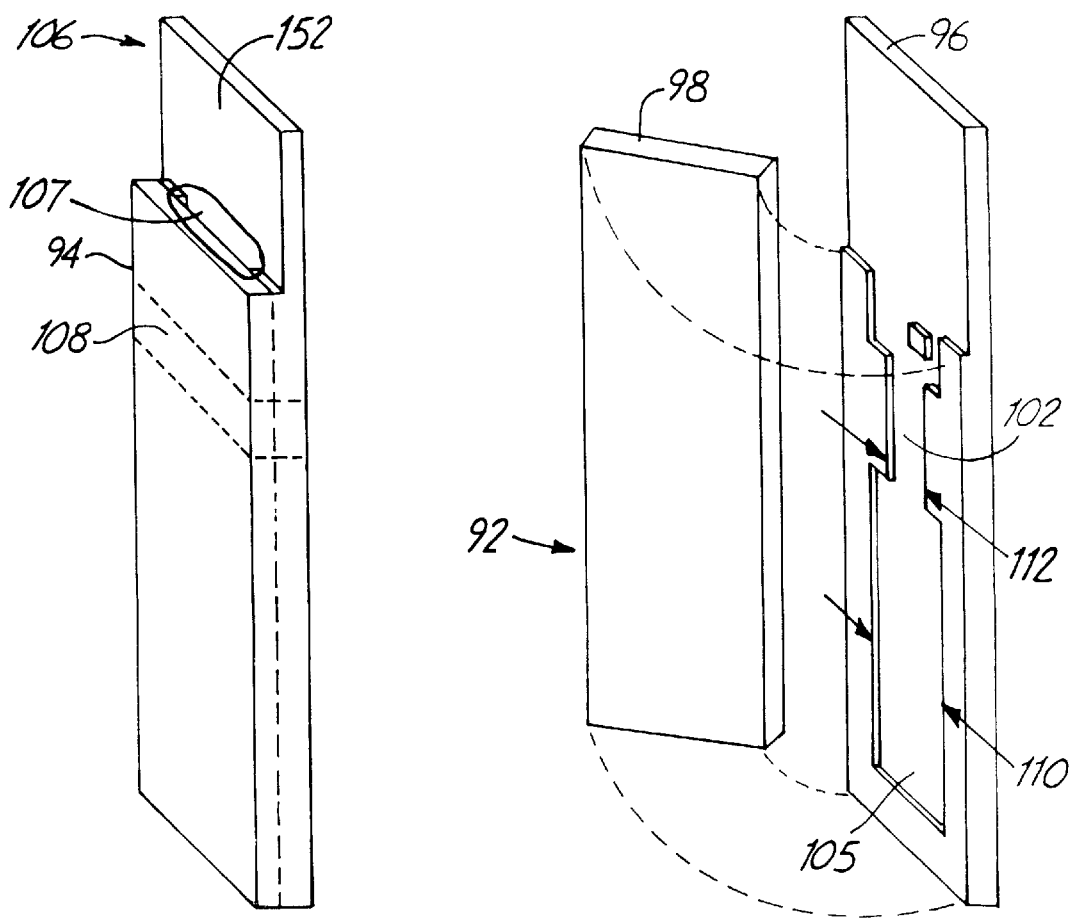
FIG. 10 shows and assembled view and an exploded view of layers of a pressure sensor with a channel in only one layer.

In FIG. 10, an alternate embodiment of a pressure sensor is shown, that is similar to the embodiment shown in FIG. 4. In FIG. 4, the channel is formed in both layers, and in FIG. 10, the channel is formed in only one of the layers. Reference numerals used in FIG. 10 are also used in FIG. 4 to identify similar or identical features. In FIG. 10, layer 98 does not have a central groove formed in it, and is essentially flat.

Figure 11:
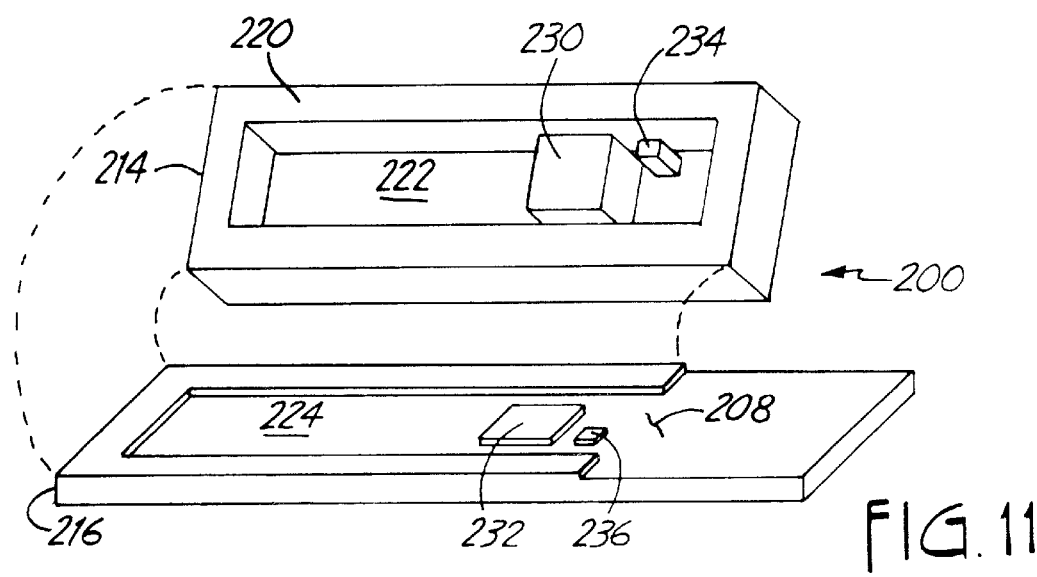
FIG. 11 shows an assembled view and an exploded view of a pressure sensor with a channel narrowed by a mesa.

In FIG. 11, an exploded view of a pressure sensor 200 is shown. The embodiment shown in FIG. 11 is an alternative to the embodiment shown in FIG. 4. In FIG. 11, the central channel is narrowed or reduced in width by adding a support mesa shown at 230, 232 instead of increasing the thickness of the beam wall to narrow or reduce the width of the channel. In other respects, the sensor 200 is arranged similarly to the sensor 90 shown in FIG. 4. Layers 214 and 216 are formed of a material such as alumina that can be direct bonded. In FIG. 11, layers 214 and 216 are depicted as they appear before assembly and direct bonding. After direct bonding, layers 214 and 216 become a single component, an integrally formed beam. The first layer 214 has a first cavity 222 etched therein surrounded by an outer rim 220, and a second layer 216 having a second cavity 224 etched therein and extending past the outer rim 220, forming the gap 208 between the second cavity 224 and the outer rim 120. A first integral mesa 230 is disposed in cavity 222 of layer 214 between the blind end and the isolated end. A second mesa 232 is disposed in cavity 224 of layer 216 between the blind end and the isolated end 106. First mesa 230 is aligned with second mesa 232 upon assembly, and the mesas 230, 232 are integrally bonded together to form an integral support that narrows the channel. When sensor 200 is joined later to an isolating cup, the integral support is aligned with the joining surfaces of the isolating cup to provide additional support.

Third and fourth mesas 234 and 236 are disposed nearer the isolated end. Upon assembly, mesas 234, 236 do not contact one another. Mesas 234 and 236 have flat layers of electrically conductive grain growth material such as tantalum on their facing surfaces. The mesas 234, 236 allow for cavities that are deeper than the distance that grain growth can extend. After direct bonding of layers 214 and 216 is completed, the sensor 200 is heated to cause the electrically conductive grain growth material on mesas 234 and 236 to grow and complete an electrical connection between the two mesas 234 and 236. This electrical connection is completed after direct bonding so that it does not interfere with the close contact between layers 214 and 216.

The presence of a channel in each of the layers 214, 216 simplifies assembly of the sensor with precise alignment between the mating surfaces. There is a gap left for the leads to exit the channel so that the leads do not interfere with the precise alignment. After the direct bonding is completed, a seal is applied, as it is applied to the sensor in FIG. 4. The seal and the metal grain growth interconnect at 234, 236 are spaced well away from the pressure sensing region at the blind end so that the different temperature expansion coefficients of the electrically conductive grain growth material and the seal relative to the layers 214, 216 do not adversely affect sensing at blind end when there are temperature changes.

The metal films in the sensor 200 form capacitor plates, and the films are selectively applied to form sealed feedthrough leads or conductors through seal that connect to an external electronic circuit.

Although the present invention has been described with reference to preferred embodiments, workers skilled in the art will recognize that changes may be made in form and detail without departing from the spirit and scope of the invention.

What is claimed is:

1. A pressure sensor capsule with improved isolation, comprising:
    a pressure sensing body formed as a beam made of direct bonded layers of single crystal sapphire, the beam forming a beam wall around a central channel defined therein, the beam having a first end having a diaphragm adapted for fluid pressurization, and an opposite second end, the beam wall having an outer beam mounting surface between the ends; the central channel having a first width near the first end and having a second width, near the mounting surface, that is narrower than the first width;
    an isolation plate having a mounting hole therethrough and the beam mounting through the mounting hole;
    a braze joint sealingly joining the outer beam mounting surface to the mounting hole, sealingly isolating the second end from the fluid pressurization; and
    conductive film disposed in the central channel, including a pressure sensing film portion on the diaphragm, and a sensor lead portion extending from the pressure sensing portion, the beam having a notch at the second end, the notch forming an isolated lead surface on the central channel; and
    electrical contact pads disposed on the isolated lead surface.

2. The pressure sensor capsule of claim 1 wherein the braze joint is formed essentially of gold and germanium.

3. The pressure sensor capsule of claim 1 wherein the isolation plate consists essentially of Alloy 46 and the braze joint is formed essentially of gold and germanium.

4. The pressure sensor capsule of claim 1 further comprising a seal disposed in the notch, and the braze joint has a melting temperature that is lower than the melting temperature of the seal.

5. The pressure sensor capsule of claim 1 wherein isolation of the electrical contact pads reduces hysteresis during pressure cycling.

6. The pressure sensor capsule of claim 1 further comprising a temperature sensor disposed in the narrower width of the channel.

7. The pressure sensor capsule of claim 6 wherein the isolation of the electrical contact pads reduces hysteresis during temperature cycling.

8. A pressure sensor capsule with improved isolation, comprising:
    a beam made of direct bonded layers of single crystal sapphire, the beam forming a beam wall around a central channel defined therein, the beam having a first end including a diaphragm adapted for fluid pressurization, the beam having an opposite second end, the beam wall having an outer beam mounting surface between the ends; the central channel having a first width near the first end and having a second width, near the mounting surface, that is narrower than the first width;
    an isolation cup having a mounting hole therethrough and the beam mounting through the mounting hole;
    a braze joint sealingly joining the outer beam mounting surface to the mounting hole, sealingly isolating the isolated lead surface on the central channel from the fluid pressurization; and
    conductive film disposed in the central channel, including a pressure sensing film portion adjacent the first end, and a sensor lead portion extending from the pressure sensing portion, the beam having a notch at the second end, the notch forming an isolated lead surface on the central channel; and
    electrical contact pads accessible on the isolated lead surface, and wherein the sensor lead portion extends to the electrical contact pads.

9. The pressure sensor capsule of claim 8 wherein the beam is batch fabricated.

10. The pressure sensor capsule of claim 8, further comprising:
    isolation fluid filling the isolation cup; and
    an isolator diaphragm having a rim sealed to the isolator cup, the isolator diaphragm being adapted for separating a process fluid from the pressurized isolation fluid.

11. A pressure transmitter with improved isolation, comprising:
    a beam made of direct bonded layers of single crystal sapphire, the beam forming a beam wall around a central channel, the beam having a first end including a diaphragm adapted for fluid pressurization, the beam having an opposite second end, the beam wall having an outer beam mounting surface between the ends; the central channel having a first width near the first end and having a second width, near the mounting surface, that is narrower than the first width;
    an isolation cup having a mounting hole therethrough and the beam mounting through the mounting hole;
    a braze joint sealingly joining the outer beam mounting surface to the mounting wall, sealingly isolating the isolated lead surface on the central channel from the fluid pressurization;
    conductive film disposed in the central channel, including a pressure sensing film portion adjacent the first end, and a sensor lead portion extending from the pressure sensing portion to electrical contact pads, the beam having a notch at the second end, the notch forming an isolated lead surface on the central channel where the electrical contact pads are accessible; and
    an electronic circuit coupled to the electrical contact pads and providing a transmitter output representative of the sensed pressure.

12. The pressure transmitter of claim 11 wherein the beam is batch fabricated.

13. The transmitter of claim 11, further comprising:
    isolator fluid disposed in the isolator cup; and
    an isolator diaphragm sealing the isolator fluid in the isolator cup.

14. The transmitter of claim 11 further comprising:
a second sensing arrangement sensing a second pressure, the second sensing arrange including a second beam made of direct bonded layers of single crystal sapphire, second isolator cup, second conductive film and second braze joint and second electrical contact pads, the second electrical contact pads coupling to the electronic circuit, the transmitter sensing a pressure difference and generating an output representing differential pressure.

15. A turbine engine pressure probe with improved isolation, comprising:
a mounting pedestal having a first end adapted for mounting to a turbine engine housing and having a second end spaced apart from the first end and having a mounting hole shaped to receive a pressure sensor;
a beam made of direct bonded layers of single crystal sapphire, the beam forming a beam wall around a central channel, the beam having a first end including a diaphragm adapted for fluid pressurization, the beam an opposite second end, the beam wall having an outer beam mounting surface between the ends that is mounted in the mounting hole; the central channel having a first width near the first end and having a second width, near the mounting surface, that is narrower than the first width;
a braze joint sealingly joining the outer beam mounting surface to the mounting hole, sealingly isolating an isolated lead surface on the central channel from the fluid pressurization; and
conductive film disposed in the central channel, including a pressure sensing film portion adjacent the first end, and a sensor lead portion extending from the pressure sensing portion to electrical contact pads, the notch forming the isolated lead surface on the central channel where the electrical contact pads are accessible.

16. A pressure sensor capsule with improved isolation, comprising:
means for forming a pressure sensing body as a beam made of direct bonded layers of single crystal sapphire, the beam forming a beam wall around a central channel defined therein, the beam having a first end having a diaphragm adapted for fluid pressurization, and an opposite second end the beam wall having an outer beam mounting surface between the ends; the central channel having a first width near the first end and having a second width, near the mounting surface, that is narrower than the first width;
means for forming an isolation plate having a mounting hole therethrough and the beam mounting through the mounting hole;
means for sealingly joining the outer beam mounting surface to the mounting hole, including a braze joint sealingly isolating the second end from the fluid pressurization; and
means for providing a conductive film disposed in the central channel, including a pressure sensing film portion on the diaphragm, and a sensor lead portion extending from the pressure sensing portion to electrical contact pads, the beam having a notch at the second end, the notch forming an isolated lead surface on the central channel where the electrical contact pads are accessible.

* * * * *